United States Patent
Ko

(10) Patent No.: US 12,303,054 B2
(45) Date of Patent: May 20, 2025

(54) MOUNTING SYSTEM

(71) Applicant: Unique Fine Fabrics Import Inc., Woodbridge (CA)

(72) Inventor: Hou Sheng Ko, Lake Forest, CA (US)

(73) Assignee: Unique Fine Fabrics Import Inc., Woodbridge (CA)

( * ) Notice: Subject to any disclaimer, the term of this patent is extended or adjusted under 35 U.S.C. 154(b) by 0 days.

(21) Appl. No.: 18/006,999

(22) PCT Filed: Jul. 29, 2021

(86) PCT No.: PCT/CA2021/051070
§ 371 (c)(1),
(2) Date: Jan. 26, 2023

(87) PCT Pub. No.: WO2022/020964
PCT Pub. Date: Feb. 3, 2022

(65) Prior Publication Data
US 2023/0263328 A1    Aug. 24, 2023

Related U.S. Application Data

(63) Continuation of application No. 16/941,682, filed on Jul. 29, 2020, now abandoned.

(51) Int. Cl.
*A47H 1/104* (2006.01)
*A47H 1/144* (2006.01)
(Continued)

(52) U.S. Cl.
CPC ............. *A47H 1/104* (2013.01); *A47H 1/144* (2013.01); *F16B 2/12* (2013.01); *F16M 13/022* (2013.01)

(58) Field of Classification Search
CPC .......... A47H 1/104; A47H 1/144; F16B 2/12; F16M 13/022
(Continued)

(56) References Cited

U.S. PATENT DOCUMENTS

| 3,134,132 A | * | 5/1964 | Graber | A47H 1/124 |
| | | | | 248/221.11 |
| 3,297,075 A | * | 1/1967 | Howell | E04F 19/02 |
| | | | | 52/717.06 |

(Continued)

FOREIGN PATENT DOCUMENTS

| AU | 199941096 A1 | 2/2000 |
| DE | 10 2013 006 677 B4 | 7/2014 |

(Continued)

OTHER PUBLICATIONS

International Search Report and Written Opinion issued in international application No. PCT/CA2021/051070, dated Oct. 8, 2021.
(Continued)

*Primary Examiner* — Anita M King
(74) *Attorney, Agent, or Firm* — CPST Intellectual Property Inc.; Santosh K. Chari

(57) ABSTRACT

A mounting system includes a mounting bracket having an interior surface with a defined shape; an elongate track having a first side, the first side having an exterior surface that corresponds with the defined shape of the mounting bracket. The interior surface of the mounting bracket is adapted to pivotally and/or slidably receive the first side of the track. The mounting bracket further includes a locking means to secure the mounting bracket to the track.

9 Claims, 3 Drawing Sheets

(51) Int. Cl.
*F16B 2/12* (2006.01)
*F16M 13/02* (2006.01)

(58) Field of Classification Search
USPC .................................................. 248/221.11
See application file for complete search history.

(56) References Cited

U.S. PATENT DOCUMENTS

| | | |
|---|---|---|
| 3,435,876 A | 4/1969 | Toti |
| 3,975,792 A | 8/1976 | Janson |
| 4,120,474 A | 10/1978 | Hurley |
| 4,635,889 A | 1/1987 | Bell et al. |
| 4,821,370 A | 4/1989 | Magdars et al. |
| 5,106,050 A | 4/1992 | Vaccaro et al. |
| 6,039,295 A | 3/2000 | de Beijer |
| 6,550,523 B1 | 4/2003 | Chen |
| 7,367,536 B1 | 5/2008 | Anderson et al. |
| 10,285,527 B2 | 5/2019 | Mullet et al. |
| 11,457,761 B2 * | 10/2022 | Sundelin .................. A47H 1/06 |
| 2009/0205791 A1 | 8/2009 | Sans Folch |
| 2009/0242143 A1 | 10/2009 | Pham |
| 2012/0217362 A1 | 8/2012 | Affonso |
| 2013/0092646 A1 | 4/2013 | Wang |
| 2017/0055363 A1 | 2/2017 | Ankarbjork et al. |
| 2022/0202226 A1 * | 6/2022 | Quatraro ................ A47H 1/124 |

FOREIGN PATENT DOCUMENTS

| | | |
|---|---|---|
| JP | 2017070695 A | 4/2017 |
| WO | WO 2011/038421 A1 | 3/2011 |
| WO | WO 2015/165628 A1 | 11/2015 |

OTHER PUBLICATIONS

Extended European Search Report issued in European Patent Application No. 21849626.3, dated Jul. 8, 2024.

* cited by examiner

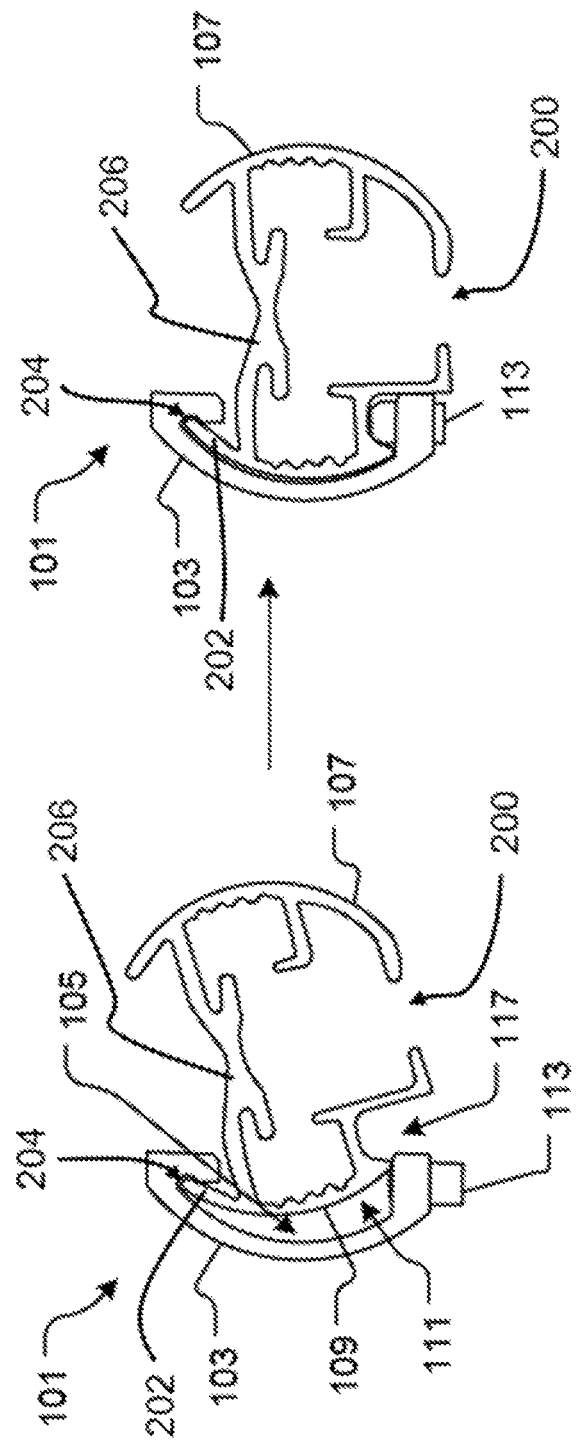

MOUNTING SYSTEM

CROSS REFERENCE TO PRIOR APPLICATIONS

The present application is a National Entry of PCT Application No. PCT/CA2021/051070, filed on Jul. 29, 2021, which claims priority under the Paris Convention to U.S. application Ser. No. 16/941,682, filed on Jul. 29, 2020. The entire contents of such earlier applications are incorporated by reference herein as if set forth in their entirety.

BACKGROUND

1. Field of the Description

The present description relates generally to mounting systems and more specifically to a mounting system that utilizes one or more mounting brackets to secure a track by sliding or pivoting the one or more mounting brackets into place and securing the one or more mounting brackets in place via a locking device.

2. Description of Related Art

Mounting systems are well known in the art and are used for various applications, such as drapery and curtain mounting. In general, such systems comprise an elongate rod or track from which the drapery is suspended. The track is secured to a surface, such as a wall or ceiling by means of a number of mounting brackets that are adapted to be secured to the wall or ceiling and also adapted to be connected to the track. Conventional systems can be cumbersome and time consuming to install and may require extensive tools for said installation.

Accordingly, although great strides have been made in mounting systems, many shortcomings remain.

There is therefore a need for a mounting system that overcomes at least one of the known shortcomings. In one example, there is a need for a system that utilizes mounting brackets that can simply slide or pivot into place in association with a track for easy and fast installation and utilization.

SUMMARY OF THE DESCRIPTION

In one aspect, there is provided herein a mounting system, comprising: at least one mounting bracket having an interior surface with a defined shape; a track having a first side adapted to engage the mounting bracket, wherein the first side is provided with an exterior surface having a shape the corresponds with the defined shape of the at least one mounting bracket; the mounting bracket including at least one locking means to secure against the track; the track including a means for receiving the at least one locking means.

DESCRIPTION OF THE DRAWINGS

The novel features believed characteristic of the embodiments of the present description are set forth in the appended claims. However, the embodiments themselves, as well as a preferred mode of use, and further objectives and advantages thereof, will best be understood by reference to the following detailed description when read in conjunction with the accompanying drawings, wherein:

FIG. 1A is an end view of a mounting system in accordance with the present description showing the track being engaged on a mounting bracket;

FIG. 1B is an end view of the mounting system of FIG. 1A after the track is engaged with a mounting bracket;

Figure 2A:
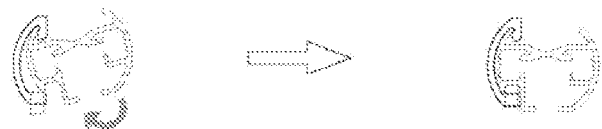
FIGS. 2A-2D are end views depicting various configurations of the mounting system described herein.
Figure 2B:
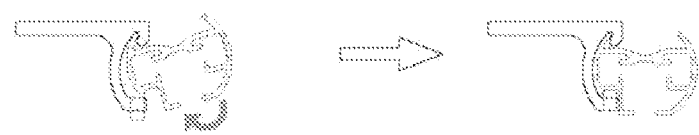
Figure 2C:
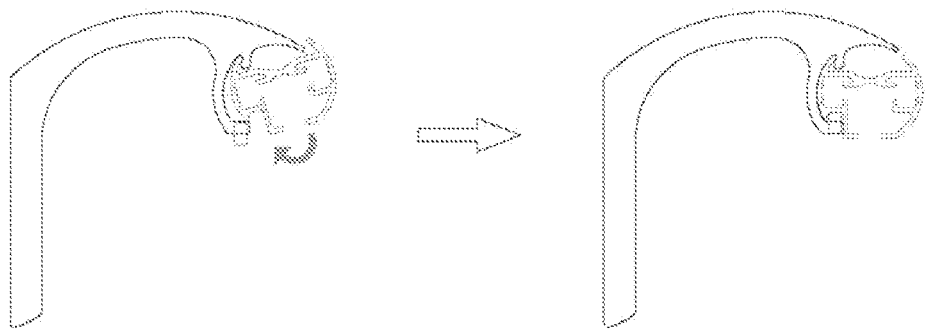

While the system and method of use of the present description are susceptible to various modifications and alternative forms, specific embodiments thereof have been shown by way of example in the drawings and are herein described. It should be understood, however, that the description herein of specific embodiments is not intended to limit the present description to the particular embodiment disclosed, but on the contrary, the intention is to cover all modifications, equivalents, and alternatives falling within the spirit and scope of the present description as defined by the appended claims.

DETAILED DESCRIPTION

Illustrative embodiments of the system and method of use of the present description are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The system and method of use in accordance with the present description overcomes one or more of the above-discussed problems commonly associated with conventional mounting systems. Specifically, the present description utilizes mounting brackets that have an exterior shape that corresponds to the shape of at least part of a track, thereby allowing for quick installation or connection between the brackets and the track. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present description, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the description to the precise form disclosed. It is chosen and described to explain the principles of the description and its description and practical use to enable others skilled in the art to follow its teachings.

Referring now to the drawings wherein like reference characters identify corresponding or similar elements throughout the several views, FIG. 1A and FIG. 1B, referred to collectively herein as FIG. 1, depict an end view of a mounting system 101 in accordance with an aspect of the present description. As shown, the system generally comprises a rod or track 107 and a number of support brackets 103. A portion of one bracket 103 is shown in FIG. 1. As known in the art, the brackets 103 are adapted for being secured to any surface, such as a wall or ceiling etc., that is to be covered with a covering, such as drapery. The brackets 103 are also adapted to support the rod or track 107, from which the drapery is suspended. Various methods are known for connecting such tracks to mounting brackets.

As is known in the art, the track 107 comprises a generally elongate body having a rail, such as shown at 200, defined therein. In an aspect as illustrated in FIG. 1, the rail 200 is adapted to receive a plurality of roller clips (not shown) as known in the art, wherein the drapery is attached to such roller clips.

In the contemplated embodiment, system 101 comprises mounting brackets 103 having an interior profile or surface 105 with a defined shape that is complementary to an outer surface of at least a portion of the track 107. In particular, the interior surface 105 of the bracket 103 is provided with a shape that is complementary to a first side 109, and more particularly to the exterior surface 111 of the track 107. In the illustrated embodiment, the exterior surface 111 of the track 107 is provided with a generally curved surface, which corresponds to the shape of the interior surface 105 of the bracket 103.

In a preferred aspect, the first side 109 of the track 107 includes a free upper end forming a flange 202, which may extend along the length of the track 107. The mounting bracket 103 may also be provided with a groove 204 formed as part of the interior surface 105. As illustrated in FIG. 1, the groove 204 of the mounting bracket 103 is adapted to receive the flange 202 of the track 107. As can be seen in comparing FIGS. 1A and 1B, for engaging the track 107 with the bracket 103, the track 107 is first manipulated to insert the flange within the groove 204 as shown in FIG. 1A. Following this, the track 107 is further manipulated to insert the remainder of the first side 109 of the track 107 into the bracket 103 until the exterior surface 111 of the track 107 comes into contact with the interior surface 105 of the bracket 103, as shown in FIG. 1B. At this point, the track 107 may be described as being engaged within the bracket 103.

The brackets 103 preferably also include a locking means 113 that is configured to secure the mounting bracket 103 to the track 107 to prevent or inhibit disengagement of track 107 from the bracket 103. For this purpose, and as shown, the mounting bracket 107 is provided with a groove or indentation 117 that is adapted to receive the locking means 113 once the track 107 is connected to the bracket 103. In this regard, the locking means 113 preferably comprises an elongate component that is extendible from the body of the mounting bracket that serves to prevent the manipulation of the track 107 out of the interior surface of the mounting bracket 103. By way of example, the locking means may comprise a locking pin, such as a tab or screw, etc., that a user can turn or push to extend into the groove 117. As will be understood, the engagement of the flange 202 within the groove 204 of the mounting bracket further serves to prevent disengagement of the top end of the track 107 from the mounting bracket 103.

In FIG. 1, the engagement of the track 107 with the mounting bracket 103 is shown as requiring a rotational or pivoting manipulation of the track 107 with respect to the mounting bracket 103. This would be a preferred manner of engaging the two components since this can be achieved by first securing the mounting brackets to a surface at the required spacing and subsequently engaging the track 107 thereto. However, as will be appreciated, the track 107 and brackets 103 are also configured to mutually slide with respect to each other. For example, the track 107 may be inserted end-wise into the interior profile 105 of the mounting bracket 103, or vice versa. Thus, the track 107 and/or the bracket 103 may be slidingly moved with respect to each other until the bracket 103 is positioned at the desired location along the length of the track 107. At this point, the locking mean 113 may be engaged to secure the respective positions of the track 107 and bracket 103.

Once the track 107 and brackets 103 are engaged, drapery, curtains, or any other suspended articles may then be secured within the rail 200 of the track 107 as known in the art. As will be understood, once the drapery is attached, the track 107 will be subjected to a downward force exerted by the weight of the drapery. The track 107 must therefore be designed with a sufficient strength to withstand such force, particularly since it is essentially cantilevered from the bracket 103, as illustrated. For this purpose, the track 107 may be provided with an internal support or reinforcing means, such as one or more ribs 206. Other means for reinforcing the track 107 would be apparent to persons skilled in the art.

It should be appreciated that the shapes of the interior surface of the track and the exterior surface of the bracket can vary, such as being in a curved C-shape as shown, or in alternative shapes. Further, the system can be adapted for use with various applications, such as for the hanging of drapery and curtains.

One of the unique features believed characteristic of the present description is the configuration of the mounting bracket and the track that allows for the two to easily be connected and secured together thereby facilitating the installation process.

Figure 2D:
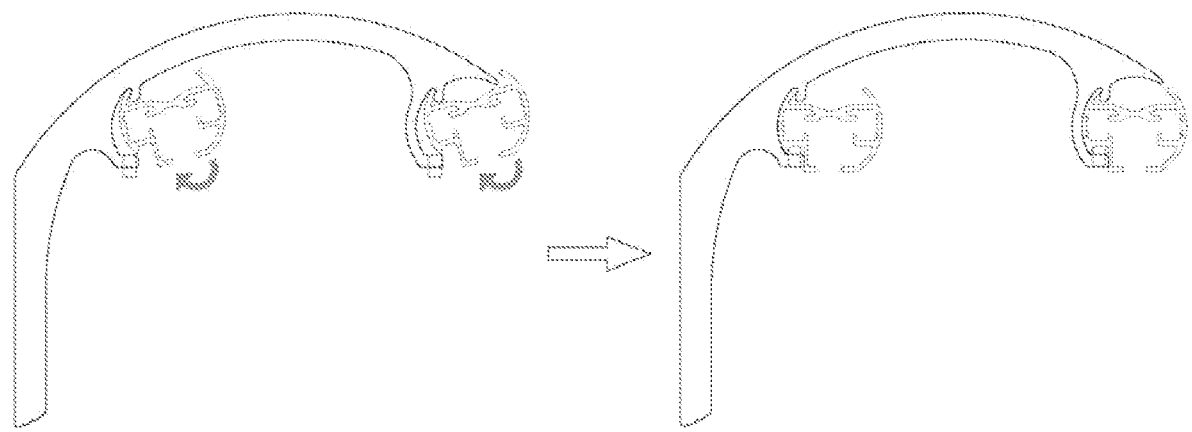

In FIGS. 2A-2D, various other aspects of the description are shown, including a single/splice connection (FIG. 2A); a ceiling bracket (FIG. 2B); a single bracket (FIG. 2C); and a double bracket (FIG. 2D).

Figure 3:
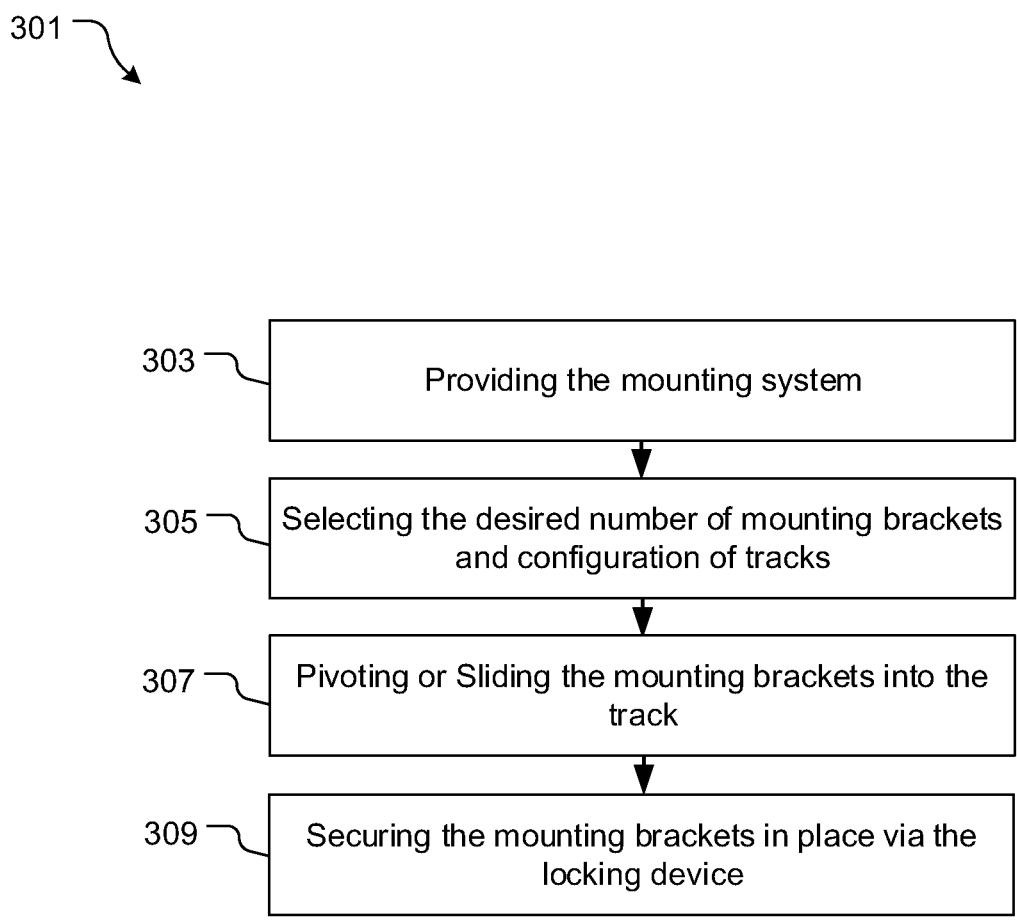
FIG. 3 is a flowchart of a method of use of the mounting system described herein.

In FIG. 3, a flowchart 301 depicts a method of use of system 101. During use, the necessary track and correct number of mounting brackets are selected, as shown with boxes 303, 305. The user will then pivot or slide the mounting brackets 103 in place along the length of the track 107, as shown with box 307. The brackets 103 will then be secured, via the locking means 113 and groove 117, to the track 107, as shown with box 309. The user can then proceed to utilize the system as needed.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the description. Accordingly, the protection sought herein is as set forth in the description. Although the present embodiments are shown above, they are not limited to just these embodiments, but are amenable to various changes and modifications without departing from the spirit thereof.

What is claimed is:

1. A mounting system, comprising:
at least one mounting bracket having a generally concave shaped interior surface; and
a track having, when in use, an upper end and a lower end, and a first side adapted to engage the mounting bracket, the first side having a generally convex shaped exterior surface corresponding to and adapted to be received in the concave shaped interior surface of the at least one mounting bracket;
the mounting bracket including at least one locking means to secure the track to the mounting bracket, wherein the locking means comprises a locking pin that is extendible through the mounting bracket;
the track including, on the lower end thereof, a means for receiving the at least one locking means;
the first side of the track including a flange adjacent the upper end of the track, wherein the flange comprises a free upper end and wherein the at least one mounting bracket includes a groove adapted to receive the flange;
and wherein the track is adapted to pivot into the mounting bracket to enable the first side of the track to be engaged within the interior surface of the at least one mounting bracket.

2. The mounting system of claim 1, wherein the track is adapted to be engaged with the mounting bracket by sliding the track through the interior surface of the at least one mounting bracket or by sliding the at least one mounting bracket over the track.

3. The system of claim 1, wherein the first side exterior surface has a generally curved C-shape.

4. The system of claim 1, wherein the means for receiving the at least one locking means comprises a groove or indentation on the track, wherein the groove or indentation is configured to receive the locking means.

5. The system of any one of claim 4, wherein the locking means comprises a locking pin that is extendible through the mounting bracket and a thickness of the track and into the groove or indentation of the track.

6. The system of claim 1, wherein the at least one mounting bracket is adapted to be secured to a vertical or generally vertical surface.

7. The system of claim 1, wherein the at least one mounting bracket is adapted to be secured to a horizontal or generally horizontal surface.

8. The system of claim 1, wherein the at least one mounting bracket is adapted to receive more than one track.

9. The system of claim 1, wherein the track includes a rail adapted to receive clips.

* * * * *